(12) United States Patent
Lund et al.

(10) Patent No.: US 6,669,484 B1
(45) Date of Patent: Dec. 30, 2003

(54) TALKING INTERACTIVE MICROSCOPE

(75) Inventors: Bruce D. Lund, Chicago, IL (US); Krishnan Srirangam, Chicago, IL (US)

(73) Assignee: Lund & Company, Chicago, IL (US)

(*) Notice: Subject to any disclaimer, the term of this patent is extended or adjusted under 35 U.S.C. 154(b) by 167 days.

(21) Appl. No.: 09/938,050

(22) Filed: Aug. 24, 2001

(51) Int. Cl.[7] .......................... G09B 23/00; G02B 21/26
(52) U.S. Cl. .................... 434/276; 434/307 R; 359/391
(58) Field of Search .................. 434/276, 283, 434/295, 296, 297, 298, 307 R; 446/219, 397, 175; D21/483; D16/131, 130; 359/383, 391

(56) References Cited

U.S. PATENT DOCUMENTS

| | | | | |
|---|---|---|---|---|
| 4,192,580 A | * | 3/1980 | Meyer ........................ 359/801 |
| D301,498 S | * | 6/1989 | Nuttal et al. ................ D21/523 |
| 5,119,233 A | * | 6/1992 | Hayashi ...................... 359/390 |
| D401,976 S | * | 12/1998 | Wong ........................ D21/483 |
| 5,855,483 A | * | 1/1999 | Collins et al. .............. 434/322 |

* cited by examiner

Primary Examiner—S. Thomas Hughes
Assistant Examiner—Alex F. R. P. Rada, II

(57) ABSTRACT

An interactive microscope assembly wherein when a slide is placed on a holder a program will audibly identify the slide. A keypad is used to input the slide number and a built-in program provides relevant information. An indexing system is also provided which in conjunction with a series of buttons provides audio information relating the portion of the specimen to which the indexing system is directed.

5 Claims, 1 Drawing Sheet

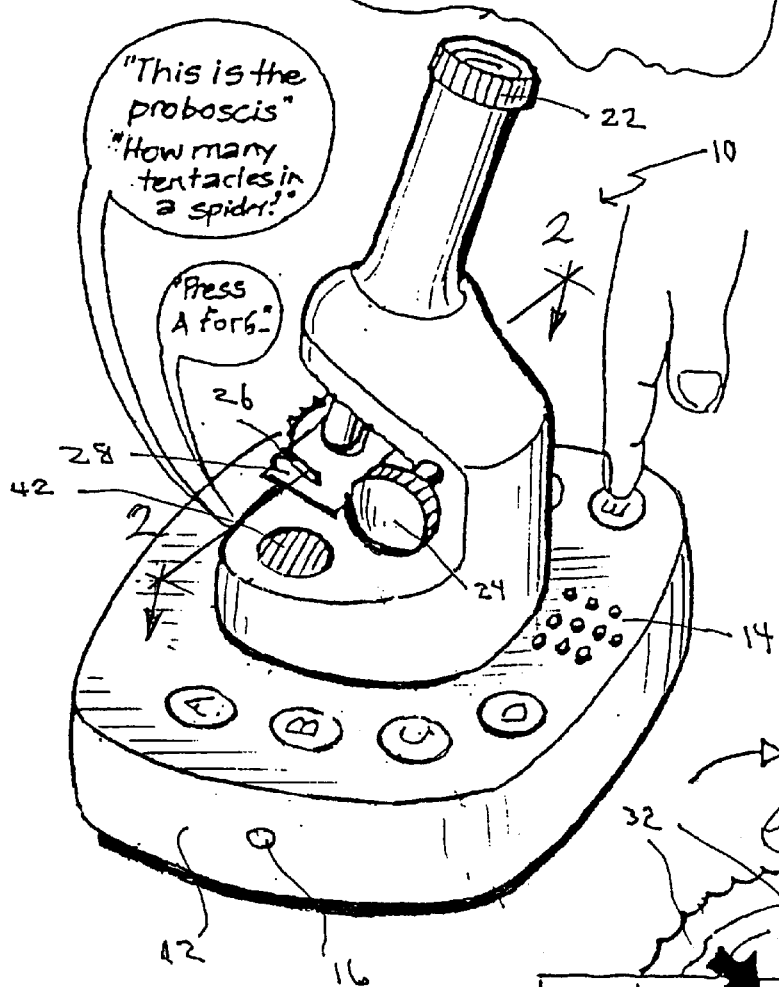
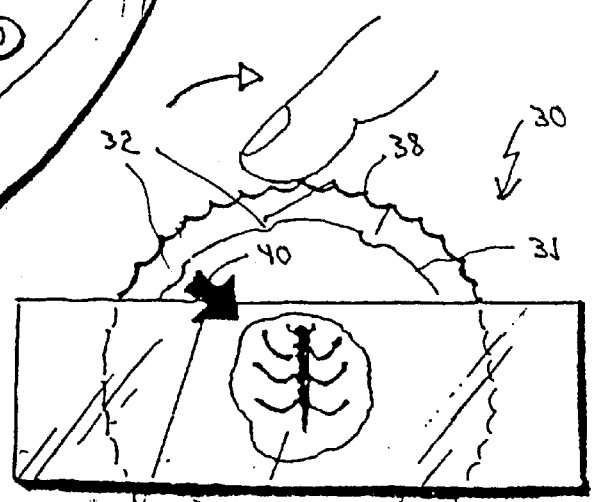
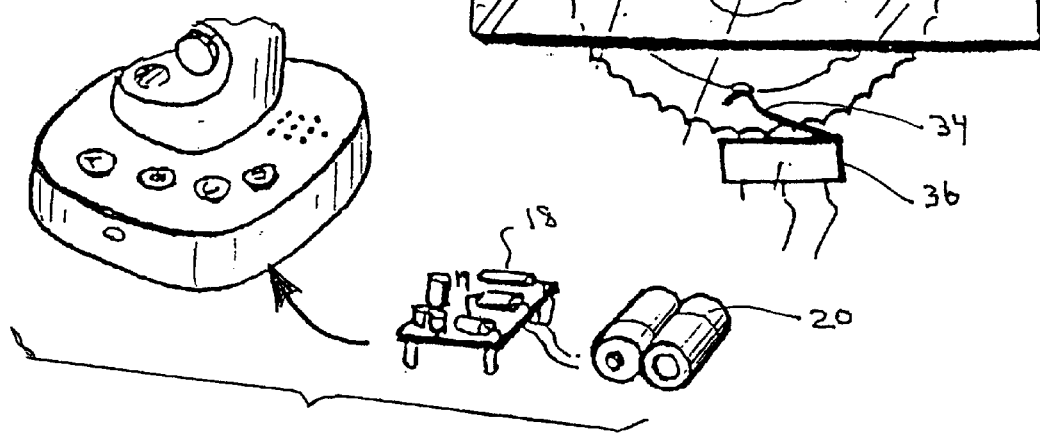

TALKING INTERACTIVE MICROSCOPE

BACKGROUND OF THE INVENTION

Microscopes have long been fascinating objects for children to play with. Toy microscopes have been very popular toys for the inquisitive child. The curiosity of children is endless. They will pick up objects from wherever they are playing and it will delight them to examine them closely under a microscope if they are fortunate to have one.

Give a child a toy microscope that will magnify an object five (5) or more times and they will be absorbed for hours. It has long been desired to have an inexpensive microscope available as a learning tool that will interact with the user and in so doing teach the child about a wide variety of objects such as numerous varieties of insects, plants or other small objects that require magnification.

SUMMARY OF INVENTION

In accordance with the present invention there is provided a microscope that is designed to be interactive with the user and serve as a learning tool.

The microscope when turned on is provided with a programmed speaker system that is activated by the user. The microscope assembly comes with a series of slides on which there are located specimens that are described in detail in a specially provided program that is properly activated by a keypad. The number to be entered into the keypad is triggered by the specimen loaded into the viewing bed of the microscope. When the specimen is identified by the speaker system located in the base of the microphone the user will be asked to choose between "facts" and "question and answer". If "facts" are chosen the "point and learn" system is used. An arrow will point to a certain part of the specimen and the programmed audio triggered by the position of the arrow will set forth the relevant facts. The point and learn arrow system works by turning a thumbwheel disposed below the slide holder that has an arrow located thereon. The thumbwheel has indentations that when contacted by a leaf spring or its equivalent activates a switch that is programmed to identify the portion of the specimen to which the arrow is pointed.

If the "question and answer" portion of the microscope is used a second button is pressed that will result in the programmed audio system saying "Good, you have chosen questions and answers." The unit will ask multiple choice questions and the user can answer by selecting one of the provided buttons. The user can skip from question to question by pressing an "enter" button. There are literally hundreds of facts and questions and answers regarding the specimens that will keep a child entertained for hours while learning all about the specimens under the microscope.

Thus it can be appreciated that the invention provides a very useful interactive microscope that will enable a child to learn about a wide variety of small specimens by having them magnified and identified by a programmed speaker system.

The invention will be further understood by the following drawings and descriptions thereof.

DESCRIPTION OF THE DRAWINGS

FIG. 1 is a perspective view of a microscope assembly embodying the present invention;

FIG. 2 is an enlarged view of the "point and learn" feature taken along line 2—2 FIG. 1; and FIG. 3 is a partial perspective view of the base and its contents.

DESCRIPTION OF THE INVENTION

In FIG. 1 there is illustrated in perspective applicant's novel interactive microscope 10. The microscope assembly 10 includes a base unit 12 that incorporates a keypad 14, an on/off switch 16 operating buttons A, B, C and D, a circuit board 18 containing a predetermined program for the slide kit, and a battery power source 20 all of which will be described in detail hereinafter.

The microscope assembly 10 includes an eyepiece 22 that is adjustable by a knob 24. The microscope also includes a holder 26 for a slide 28 containing a specimen. Each slide has a two digit number on it. When the slide 23 is placed on the slide holder 26 the program will ask you to enter the number of the slide on the keypad 14 in the center of the base 12. The number pressed on the keypad is entered by pressing the enter button E and the program will audibly identify the subject matter of the slide. Button A is used for obtaining facts and button B is used for question and answers. While a manual keying in of the slides is illustrated means for automatically identifying the slide being inserted could be employed.

Located beneath the slide 28 and secured in position is a "point and learn" apparatus 30 shown in FIG. 2. Apparatus 30 consists of a dial 31 with indentations 32 that sequentially effects the operation of a leaf spring 34 that is part of a switch 36 that is tied into the programmed information in the circuit board 18. A knob 38 located below the dial 31 and connected thereto is used for turning the dial to different locations. An arrow 40 on the dial 31 is moved therewith and in conjunction with the switch 36 an activated program identifies the portion of the specimen to which the arrow points which information is audibly heard through the speaker 42.

The function of the various portions of the microscope assembly will be best understood from the following method of operation of the novel interactive microscope microlab.

A slide 28 is placed in the slide holder 26 and the unit is turned on by switch 16. Every slide has a number and when placed on the slide holder starts the programmed audio that will first welcome the user, second identify the slide number and third tell the user to enter the number on the keypad and press enter. The enter button correlates to a portion of the program that will provide information about the slide. Button A is for facts and button B is for questions and answers. If button A is selected the unit will tell the user information relating to where the arrow disc is pointing. As the arrow disc 31 is turned and points to a different portion of the specimen the unit is programmed to tell the user a fact about the portion of the specimen to which the arrow is then pointing.

If Button B is pressed which is for questions and answers the unit asks multiple choice questions and the user answers the questions by using the A, B or C buttons which will evoke an audio response. A further rotation of the disc will prompt another question etc.

Thus it can be seen that there is illustrated and disclosed an interactive microscope whereby the user can have the fascination of using a microscope to enlarge small objects and includes a series of slides containing a variety of objects which when inserted into a slide holder will with a preprogrammed audio speaker system present to the user a series of facts and information in the form of questions and answers that will serve as a teaching tool while being a pleasure to play with and have fun doing.

It is intended by the following claims to cover all modifications and embodiments that fall within the true spirit and scope of the invention.

What is claimed is:

1. An interactive microscope assembly having an adjustable eye-piece, a specimen holder for holding a specimen comprising a slide holder with a slide disposed therein, a speaker, a power source, an on/off button, a preprogrammed circuit board having at least one program, a keypad for correlating the slide with said at least one program, an indexing system including a pointer-dial switching arrangement for indicating what part of the specimen is being studied and magnified consisting of a rotating disk having an arrow pointing at a particular area of the specimen and button means tied into said program for providing audio information through said speaker relating to the part of the specimen at which the arrow is pointing.

2. A microscope assembly as set forth in claim 1 in which the button means comprise a series of buttons.

3. A microscope as set forth in claim 2 in which there is a base in which the buttons, keypad, program circuit board and power source are located.

4. A microscope assembly in accordance with claim 1 in which the disk is rotated by a thumbwheel and the disk includes indentations that effect activation of the switching arrangement and a selected part of said program.

5. A Microscope assembly including a base member, a microscope including an adjustable eye-piece secured to said base, and a specimen holder for holding a specimen comprising a slide disposed below said eye-piece, a plurality of buttons in said base, a program controller in said base and operable by said buttons, and including a program to identify facts or list questions and answers, a keypad on said base for keying information to the controller relating to the slide containing the specimen when placed on the specimen holder, a dial containing an arrow disposed adjacent the specimen and pointing to a section of the specimen, a thumbwheel for tuning said dial relative to the specimen, a switch means disposed adjacent said dial and activated by said dial when moved to various positions to activate the program to provide information through a speaker to identify facts or list questions and answers when one of said buttons is activated.

* * * * *